Figure 1A:
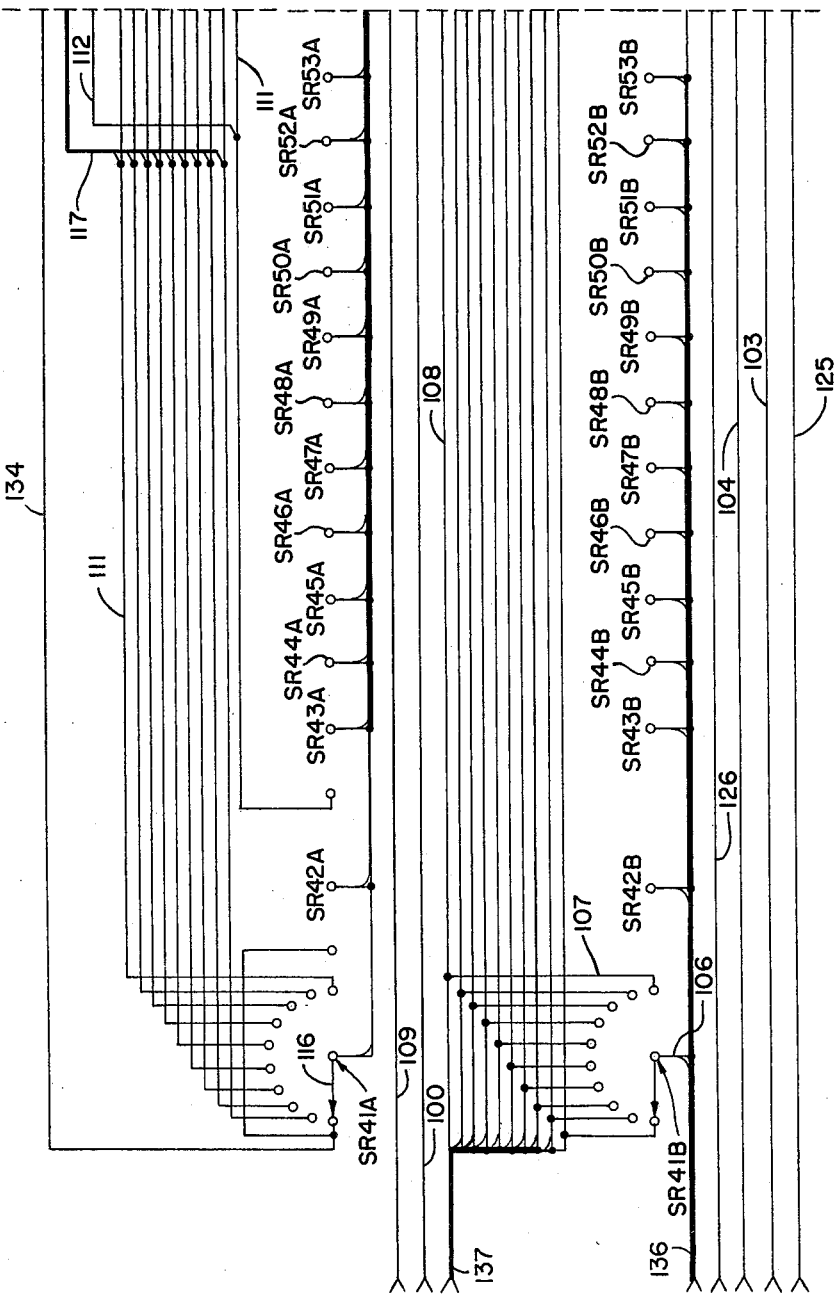

Aug. 27, 1963 F. L. SMITH 3,101,894
DATA RECORDING SYSTEM WITH ZERO SUPPRESSION
Filed Dec. 15, 1960 2 Sheets-Sheet 1

INVENTOR
FREDERICK L. SMITH
BY
THEIR ATTORNEYS

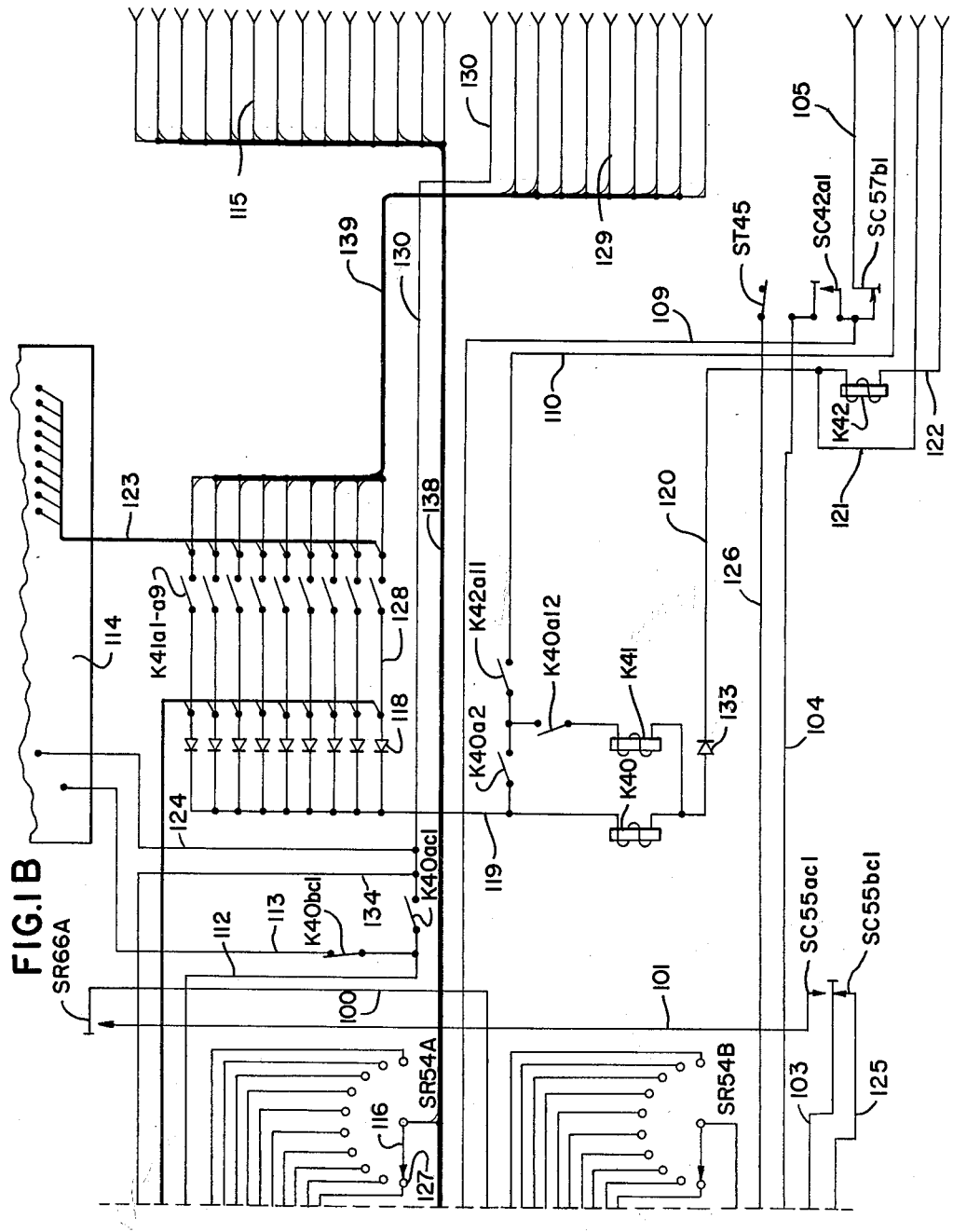

United States Patent Office 3,101,894
Patented Aug. 27, 1963

3,101,894
DATA RECORDING SYSTEM WITH ZERO SUPPRESSION
Frederick L. Smith, Dayton, Ohio, assignor to The National Cash Register Company, Dayton, Ohio, a corporation of Maryland
Filed Dec. 15, 1960, Ser. No. 75,986
2 Claims. (Cl. 235—60.38)

This invention relates to a data-processing system having a data input device and a means for reading and recording data from said input device, and more particularly relates to a circuit for controlling the punching operation of said recording means, whereby all zeros contained in the data read which are insignificant will not be punched.

In the one particular embodiment of the invention as herein illustrated and described, the data-processing system includes a number-checking device in addition to the data input device and the recording device.

The data input device used in this system may be any type of a keyboard-operated calculating mechanism. Included in this classification are cash registers, accounting machines, or adding machines. For an example of the type of calculating machine that may be used, reference may be had to United States Patent No. 2,692,726, which issued to Nelson R. Frieberg and Oscar F. Larsen on October 26, 1954. The recording apparatus is of a type similar to that disclosed in the co-pending United States patent application of Richard L. Ditmer et al., Serial No. 622,591, filed November 16, 1956, now United States Patent No. 3,014,647, issued December 26, 1961, while the number-checking device is of the type disclosed in the co-pending United States patent application of Peter S. Glaser et al., Serial No. 699,984, filed December 2, 1957, now United States Patent No. 3,040,985, issued June 26, 1962. Reference may also be had to the co-pending United States patent application of Mark J. Garvey and Walter U. Andrews, Serial No. 38,506, filed June 24, 1960, now United States Patent No. 3,049,293, issued August 14, 1962, which discloses a combination of a caculating machine and a number-checking device as a data-processing system.

Data which is normally entered on the keyboard of the input device is that generally termed "Account No.," used to identify specific commercial accounts of the institution in which the data-processing equipment is used. Upon operation of the input device, the data is transferred to a series of read-out switches, from which the data is then inserted into the number-checking device.

The operation of the account-number-checking device determines whether the account number conforms to a predetermined rule or prescription. If the account number is acceptable under this rule, the recording device is then actuated, which results in the account number's being punched in a record tape.

The circuit disclosed in this application is applied to the reading of the data set up in the read-out switches of the input device by the number checker and the recording apparatus. The use of this type of circuit allows the tape recorder to record only those zeros which are of a significant nature. Prior zero suppression circuits have required the data input device to have two sets of read-out switches when used in conjunction with one other data-processing device. With the addition of another data-processing device to the system, another set of read-out switches is required on the data input device. In the case where the addition of the second device may take place after the data input device has been in use in the field, the modification of the data input device to accommodate this second device would be extensive and costly. It is, therefore, an object of this invention to provide a zero suppression circuit which requires the data input device to have only two sets of read-out switches, regardless of whether one or two data-processing devices are used with the input device.

It is another object of this invention to provide an improved zero suppression circuit.

With these and other, incidental, objects in view, the invention includes a novel circuit arrangement which is hereinafter described with reference to the drawing which accompanies and forms a part of this specification.

The drawing is a schematic diagram of the improved zero suppression circuit. FIG. 1A constitutes the left side of the drawing and shows the majority of the read-out switches located in the data input device and the account number checker, and also includes line connections to the account number checker. FIG. 1B constitutes the right side of the drawing and shows the remaining portion of the read-out switches, and the zero-suppression circuit. Also includued is a portion of the program board used to illustrate the invention and line connections to the recorder.

Referring to the drawing, there are shown two sets of read-out switches, SR41A and SR41B, which are located in the data input device. Data in the form of an account number, set up on the keyboard of the input device, is transferred to the read-out switches SR41A–SR54A and SR41B–SR54B inclusive, upon operation of the input device, as described fully in the previously-mentioned co-pending United States patent application of Mark J. Garvey and Walter U. Andrews, Serial No. 38,506, now United States Patent No. 3,049,293, issued August 14, 1962.

During the operation of the input device, the normally open switch SR66A, similar to switch 140 shown in FIG. 16 of the Garvey et al. patent referenced above, and the double-acting switch contacts SC55ac1, similar to switch contacts 183a shown in FIG. 16 of the Garvey et al. patent referenced above, both located in the input device, close, thereby completing a circuit from the number checker over the conductor 100, which corresponds to the top conductor leading to switch 140 shown in FIG. 16 of the Garvey et al. patent, the switch SR66A, the conductor 101, and the switch contacts SC55ac1 to the conductor 103, which leads back to ground in the number checker. The conductor 103 is similar to the conductor leading to the common contact 183 of the switch 182 shown in FIG. 16 of the Garvey et al. patent cited above. This circuit provides an energizing pulse to a relay (not shown), similar to the relay 601 shown in FIG. 16 of the Garvey et al. patent, in the number checker, which initiates an operation of the number checker. Operation of the input device also closes a switch SC42a1, which would normally complete an energizing circuit from the number checker over the conductor 104, the switch SC42a1, the normally closed switch SC57b1, and the conductor 105, to the motor section of the recording device, but this circuit is interrupted by the opening of a switch (not shown), located in the number checker, upon the operation of the number checker. The conductor 104 is connected to a bridge rectifier similar to the one shown in FIG. 16 of the Garvey et al. patent, while the conductor 105 corresponds to the conductor leading to the K1 relay shown in FIG. 73c of the Ditmer et al. patent cited previously, the energizing of which controls the operation of the recorder motor as disclosed in column 12 of that patent.

The initial operation of the number checker also closes switch contact SC55bc1, which completes a circuit from the conductor 103, the switch contacts SC55bc1, and the conductor 125 to the number checker, for initiating a scanning operation of the switches SR41B–SR54B, inclusive, by the number checker. The conductor 125 is similar to the conductor leading from the contact 183b to the relay 603 shown in FIG. 16 of the previously cited Garvey et al. patent, the operation of which is explained fully in columns 24 and 25 of said patent. For a more detailed description of the operation of the number checker, reference should be made to the previously-mentioned co-pending United States patent applications of Peter S. Glaser et al., Serial No. 699,984, now United States Patent No. 3,040,985, issued June 26, 1962.

The scanning operation by the number checker of the read-out switches SR41B–SR54B, inclusive, occurs over a cable 136 leading from the number checker and containing a number of conductors 106 (FIG. 1A), the switches SR41B–SR54B, and the series of conductors 107 and 108, the particular conductor in the cable 137, to the number checker. The conductor 106 is similar to the conductors leading to the output terminals P11–P20 shown in FIG. 5A of the United States patent to Peter S. Glaser et al. No. 3,040,985, while the conductors 108 are the conductors leading from the keyboard 20 to the E registers shown in the same figure. If the account number is acceptable, as determined by the operation of the account number checker, the number checker will generate an energizing pulse over the conductor 109, connected in a manner similar to that of conductor 104 described above, the normally closed switch SC57b1, and the conductor 105 to the tape recorder motor, thus energizing the tape recorder for a recording operation. After this has occurred, the number checker will then shut itself off. It should be noted that a switch ST45 is located in the tape recorder energizing circuit. This switch is located on the input device and is manually operated by the operator. When closed, it will complete an energizing circuit over the conductor 126, connected in a manner similar to that of conductor 104 described previously, the switches ST45, SC42a1, and SC57b1, and the conductor 105 to the tape recorder motor. It will be seen that this switch completely eliminates the operation of the number checker from the data-recording operation if so desired.

Initial operation of the recorder provides an energizing circuit to the A.C. relay K42 from the recorder over the conductors 121 and 122 (FIG. 1B). The conductor 121 leads to an A.C. source located in the recording device, while the conductor 122 leads to ground. The conductors 121 and 122 are similar to the conductors shown in FIG. 73A of the Ditmer et al. patent, cited previously, leading to the 117-volt A.C. source through the contacts ST40a1 and ST40a2. Energization of the relay K42 closes the contacts K42a11 (FIG. 1B). The closing of these contacts provides a seal-in path to the relays K40 and K41 over the conductor 110, similar to conductor 1304 shown in FIG. 73B of the Ditmer et al. patent cited above, which leads to a D.C. power source located in the tape recorder, as will be described hereinafter.

The scanning of the switches SR41A–SR54A, inclusive, by the recording device occurs in the sequence of highest order first. For a full disclosure of the method of scanning the switches SR41A–SR54A, reference should be made to the previously cited United States patent of Richard L. Ditmer et al., No. 3,014,647. In this case, the switches would be scanned beginning with the switch SR54A, representing the highest order, and ending with the switch SR41A. Referring to the drawing, it may be seen that, if the switch SR54A has a zero set up on its contacts, the circuit will be completed from the recording device over the read-out conductor 115, the particular conductor in cable 138, the wiper arm 116, the zero contact 127 of the switch SR54A, the conductors 111 and 112, the normally closed contacts K40bc1, and the conductors 113 to a program board 114, located in the input device. The conductors 115 are similar to the conductors in the cable 1360 shown in FIG. 73D of the patent to Ditmer et al., No. 3,014,647, cited previously, while the conductor 113 is similar to one of the conductors in the cable 1364 shown in FIGS. 73D and 73E of the same patent. The use of the program board allows the recording apparatus to be controlled to provide any number of operations as disclosed in the previously mentioned Ditmer et al. patent No. 3,014,647. Included among the operations that may be provided by the program board is the control of the recording apparatus to step to the next switch without punching, or to punch a zero, if that is required, or to punch a special symbol. In this application, it is assumed that only those zeros which are of a significant nature will be punched; therefore the program board is set up to operate the scanning control of the recording device to step to the next switch without punching, in the case where a zero which is of an insignificant nature is read, as in this case. The program board 114 is similar to the program board disclosed in the aforementioned Ditmer et al. patent and shown in FIGS. 43 and 73E of that patent as consisting of a lower program board 733 and an upper program board 734.

Each succeeding switch is scanned in the same manner as switch SR54A, with the same results occurring as long as zeros are set up on the switches. Upon the scanning of the first switch having a digit other than zero, the circuit will then be completed from the read-out conductor 115, the particular conductor in the cable 138, over the wiper arm of the switch in question, the conductors 111 and 117, the individual diode 118, the conductor 119, the D.C. relay K40, the isolating diode 133, and the conductors 120 and 122 to a ground line located in a tape recorder, as described previously. This circuit energizes the relay K40, thereby closing the contacts K40a2 and K40a12. The closing of these contacts completes an additional energizing circuit to the K40 relay, and also provides an energizing circuit to the relay K41, both of these circuits being completed over the conductor 110, which is connected to a D.C. source located in the tape recorder. The other side of the circuit is completed over the conductors 120 and 122 to ground, as previously described.

Energization of the relay K41 closes the contacts K41a1–K41a9, inclusive, thus completing the circuit from the switch that is being scanned by the recording device over the conductors 117, 128, the particular switch in the group of K41a1–K41a9 switches, the particular conductor in the cable 139, and the conductor 129, which corresponds to one of the conductors in cable 1364 shown in FIGS. 73D and 73E of the Ditmer et al. patent, which leads to a particular punch magnet (not shown), located in the tape recorder for punching of the digits set up on the switch that is being scanned. A circuit is also completed over the conductor 123 to the program board 114. The conductor 123 is similar to one of the conductors in the cable 1364 shown in FIGS. 73D and 73E of the Ditmer et al. patent cited above. This circuit provides for the programming of punching special instructions into the record tape. Thus, when the tape is subsequently fed into the data-processing computer, these special instructions will govern the operation of the computer in regard to the data that is punched in the tape.

It should be noted that, once the contacts K41a1–K41a9, inclusive, are closed, any digit other than zero, scanned by the recording device, will control the corresponding punching magnets, located in the tape recorder, over the circuit described above, to punch the digit in the record tape. The use of the diodes 118 prevents any leakage of current over any other of the contacts K41a1–K41a9 than the particular contact being read. This allows any number of readout circuits to control the energization of the solenoid K40 and insures that only the digit read will be punched.

In the case where a zero is set up in the switches, after a digit other than zero has been read by the recording device, indicating that any subsequent zero is now significant, the following circuit will be in effect. Upon the energization of the relay K40 due to the scanning of the first digit other than zero, as described previously, the normally open contacts K40ac1 closed, while the normally closed contacts K40bc1 opened. This opening of the contacts K40bc1 interrupts the zero digit circuit, previously described. Any zero now scanned by the recording device will cause a circuit to be completed over the conductor 112, the now-closed contacts K40ac1, and the conductor 130 to the punch magnet, located in the recording device (not shown), for punching a zero in the record tape. The conductor 130 is similar to one of the conductors in the cable 1364 shown in FIGS. 73D and 73E of the Ditmer et al. patent cited previously. It will thus be seen that only those zeros which are of a significant nature will be punched. In those cases where a zero is to be punched regardless of whether a significant digit has not been previously read, a special circuit may be connected from the zero contact of the switch to the zero punch line of the recorder by-passing the control of the contacts K40ac1 and K40bc1. This circuit is shown in connection with the switches SR41A and SR42A where conductor 134 is connected from the zero contacts of the switches to the zero punch conductor 130.

The reading of a significant zero will also complete a circuit over the conductor 124 to the program board 114, where such information may be used for controlling the recording device to punch special instructions, as described previously.

Upon the completion of the scanning cycle by the recording device, the recording device will shut itself off, resulting in the de-energization of the relay K42. De-energization of the relay K42 opens the contacts K42a11, thereby dropping out the relays K40 and K41, which results in the opening of the contacts K41a1–K41a9 and K40ac1, and the closing of the contacts K40bc1, thus conditioning the circuit for a new recording operation.

The novel circuit disclosed above provides a method for the suppression of insignificant zeros in the recording of data, and allows for the use of a number checker or any other data-processing device with the existing recording apparatus, without requiring an extensive modification of the input device.

While the circuit shown and described herein is admirably adapted to fulfill the objects primarily stated, it is to be understood that it is not intended to limit the invention to the one form or embodiment disclosed herein, for it is susceptible of embodiment in various other forms.

What is claimed is:

1. In a system for recording data including a plurality of readout switches having contacts representing numerical data, said contacts corresponding to the digits zero to nine inclusive, and a recording mechanism for reading the data set up on the switches in a sequence starting with the highest order readout switch to the lowest order switch, said recording mechanism being operable to punch the data read by the recording mechanism, a circuit for controlling the recording mechanism to suppress the punching of all insignificant zeros read by the recording mechanism comprising a first reading circuit, which includes a normally closed switch and all of the zero contacts of the readout switches, said reading circuit being connected to the recording mechanism for controlling the operation of the recording mechanism to skip the punching of the zero digit read over the circuit and to initiate a reading operation of the next readout switch; a second reading circuit, which includes a normally open switch and all of the zero contacts of the readout switches, said second reading circuit being connected to the recording mechanism for controlling said mechanism to punch a zero digit; a switch-operating member adapted to be energized for opening said normally closed switch in said first reading circuit and closing said normally open switch in said second reading circuit; and a plurality of third reading circuits controlled by the recording mechanism, each circuit comprising a first circuit portion connected between like contacts on said readout switches representing a digit other than zero and the recording mechanism to punch the digit read over said circuit, said first circuit portion having a normally open switch which is closed upon the energization of said switch-operating member, a second circuit portion connected between said like contacts and the switch-operating member for energizing said member upon the reading of a digit other than zero, said second circuit portion including a unilateral conducting device so orientated as to isolate the circuit being read from those circuits not being read, whereby, upon the energization of said switch-operating member, the recording mechanism will punch the digit being read and all zeros subsequently read by the recording mechanism.

2. In a system for recording data, including a plurality of readout switches having contacts representing numerical data, including zero and digits other than zero, and a recording apparatus for reading the data set up on the switches in a sequence starting with the highest order readout switch to the lowest order switch, said recording apparatus being operable to record said data, a circuit for controlling the recording apparatus to suppress the recording of all insignificant zeros read by said apparatus comprising a first reading circuit, which includes a normally closed switch and all of the zero contacts of the readout switches, said reading circuit being connected to the recording apparatus for controlling said apparatus to skip the recording of the zero digit read over the circuit and to initiate a reading operation of the next readout switch; a second reading circuit, which includes a normally open switch and all of the zero contacts of the readout switches, said second reading circuit being connected to the recording apparatus for controlling said apparatus to punch a zero digit; a first switch-operating member adapted to be energized for opening said normally closed switch in said first reading circuit and closing said normally open switch in said second reading circuit; a second switch-operating member energized upon operation of said first switch-operating member; and a plurality of third reading circuits controlled by the recorder apparatus, each circuit comprising a first circuit portion connected between like contacts on said readout switches representing a digit other than zero and the recording apparatus, said first circuit portion containing a normally open switch which is closed upon operation of said second switch-operating member, and a second circuit portion connected between said like contacts and said first switch-operating member for energizing said member upon the reading of a digit other than zero, said second circuit portion including a diode so orientated as to isolate the circuit being read from those circuits not being read, whereby, upon the energization of said first switch-operating member, the recording apparatus will record the digit being read and all zeros subsequently read by the recording apparatus.

References Cited in the file of this patent

UNITED STATES PATENTS

| | | |
|---|---|---|
| 1,896,551 | Maul | Feb. 7, 1933 |
| 1,928,656 | Von Reppert | Oct. 3, 1933 |
| 2,084,445 | Kottmann | June 22, 1937 |
| 2,155,991 | Kurowski | Apr. 25, 1939 |
| 2,340,851 | Wood | Feb. 8, 1944 |
| 2,551,093 | Bryce | May 1, 1951 |
| 2,927,729 | Boyden et al. | Mar. 8, 1960 |